United States Patent [19]

Hashimoto et al.

[11] Patent Number: 4,659,583

[45] Date of Patent: Apr. 21, 1987

[54] METHOD FOR THE PULVERIZATION OR GRANULATION OF NUTS AND SEEDS

[75] Inventors: Hitoshi Hashimoto, Kamakura; Takuzo Shibata, 17-31, 4-chome, Shiba, Kawaguchi-shi, Saitama-ken; Teruo Nagano, 52-1-5-305, 4-chome, Saiwa-cho, Tachikawa-shi, Tokyo; Kozo Hara, Yokohama; Nobuhiro Kuwahara, Fujisawa; Ikuo Yashiki, Yokohama, all of Japan

[73] Assignees: Ensuiko Sugar Refining Co., Ltd., Yokohama; Takuzo Shibata, Kawaguchi; Teruo Nagano, Tokyo, all of Japan

[21] Appl. No.: 760,292

[22] Filed: Jul. 29, 1985

[30] Foreign Application Priority Data

Oct. 3, 1984 [JP] Japan .............................. 59-206192

[51] Int. Cl.$^4$ ............................................. A23L 1/36
[52] U.S. Cl. .................................... 426/629; 426/632; 426/640; 426/658; 426/456

[58] Field of Search ............... 426/615, 629, 632, 633, 426/639, 640, 548, 658, 93, 96, 460, 456

[56] References Cited

U.S. PATENT DOCUMENTS

| | | | |
|---|---|---|---|
| 3,749,587 | 7/1973 | Billerbeck et al. | 426/633 |
| 3,903,311 | 9/1975 | Billerbeck et al. | 426/633 |
| 4,477,482 | 10/1984 | Avera | 426/632 |
| 4,529,608 | 7/1985 | Szejtli et al. | 426/658 |

*Primary Examiner*—Raymond N. Jones
*Assistant Examiner*—Marianne M. Cintins
*Attorney, Agent, or Firm*—Frishauf, Holtz, Goodman & Woodward

[57] ABSTRACT

The invention provides a method for pulverizing or granulating nuts or seeds which comprises mechanically grinding a mixture of nuts or seeds with a cyclodextrin. The invention also provides a stable particulate admixture of cyclodextrin containing nuts or seeds. The admixture is highly stable during storage and provides a versatile product for use in food processing.

22 Claims, No Drawings

METHOD FOR THE PULVERIZATION OR GRANULATION OF NUTS AND SEEDS

BACKGROUND OF THE INVENTION

The present invention relates to a method for the pulverization or granulation of nuts and seeds.

Nuts in general among fruits are formed by strong hardening of the epicarp while the pericarp as a result of the growth of the ovarian walls is relatively thin and the seminal nuclei, i.e. embryo and albumen, are used for food.

"Seeds" refer to such seeds of plants other than fruit for example seeds of vegetables, oils and fats, etc.

Nuts of various kinds all contain lipids in a high content of, usually, in the range from about 47 to about 77%. Seeds also contain high amount of lipids, usually in the range from about 30 to 55%. These nuts and seeds have a high calorific value of 500 kilocalorie (kcal)/100 grams or larger so that they belong to a class of important foods with a high nutritive value. The high content of lipids, on the other hand, is accompanied by disadvantage that the fats and oils contained therein are susceptible to oxidation when nuts or seeds are prolongedly kept in air to cause great decrease in the taste and flavor so that long-term storage of nuts and seeds is undesirable and should be avoided. When nuts and seeds absorb moisture, in addition not only is air oxidation of the oils and fats contained therein is accelerated but also the inherently pleasant touch to teeth thereof may be entirely lost so that it is essential that nuts and seeds are stored in a moistureproof container under a condition lean of air.

As is known as the uses of nuts and seeds, they are used as an accessory additive in cooking and confectionary preparation or eaten as such as a relish food in alcoholic drinking. At any rate, nuts and seeds are served as keeping the original form or in the form of relatively coarse grains although nuts and seeds may be processed into a pasty form such as peanut butter as a very specific limited case. Attempts of pulverization have been made of almond and several other specific nuts though without success for the practical use of the powder because of the poor storability of the powder due to the great hygroscopicity.

When pulverized or granulated porducts of nuts and seeds be available, the application fields of these nuts and seeds in food processing would be greatly expanded and a complete change would be caused in the aspect of utilization of nuts and seeds in food industry. Even by setting aside the conventional applications, such a pulverized or granulated product of nuts and seeds can be an extending additive in a variety of food bases such as semiprocessed and frozen food of minced meat, a frosting powder on certain dishes, a base material of snack food and noodles and the like as only a part of possible applications.

Despite the eager desire to pulverize or granulate nuts for the expansion of the application fields as is mentioned above, no successful method has yet been developed for obtaining a dry powder of nuts because a paste is always formed by the pulverization of nuts containing a large amount of lipids due to the exudation of the oily matter. Even when nuts are coarsely ground with an object to reduce exudation of the oily matter, air oxidation of the oily matter during storage is unavoidable to cause great decrease of the value as a commercial product. Further, several plant seeds are known as edible including, for example, pumpkin seeds, sunflower seeds, pine nuts and the like. Similar problems to those in nuts above described are involved also in these edible seeds so that the application fields thereof are equally limited.

SUMMARY OF THE INVENTION

An object of the present invention is therefore to provide a method for the preparation of powdered or graulated nuts and seeds free from the above described problems and disadvantages in the prior art methods and products.

Thus, the method of the present invention for the preparation of powdered or granulated nuts or seeds comprises mechanically grinding nuts or seeds with admixture of a cyclodextrin.

DETAILED DESCRIPTION OF THE PREFERRED EMBODIMENTS

The kind of nuts and seeds to which the method of the present invention is applicable is not particularly limitative and various kinds of nuts and seeds can be pulverized or granulated according to the inventive method. Examples of the nuts and seeds to be pulverized or granulated are shown below together with the typical contents of the principal constituents. These nuts and seeds can be used singly or in combination of two kinds or more.

(1) Almond, dried: water 5%; lipids 55%; protein 19%; and minerals (per 100 grams) comprising potassium 860 milligrams, calcium 230 milligrams, magnesium 260 milligrams and phosphorus 500 milligrams (2) Cashew nuts, roasted: water 4%; lipids 47% (comprising 60% of oleic acid, 18.4% of linoleic acid, 10.5% of palmitic acid and 9% of stearic acid); protein 20% and saccharides 25%

(3) Walnuts, roasted: water 4%; lipids 64% and protein 15%

(4) Brazil nuts, roasted: water 5%; lipids 65% and protein 17%

(5) Pecans, roasted: lipids 70%

(6) Hazelnuts, roasted: water 5%; lipids 59% and protein 13%

(7) Macadamia nuts, roasted: lipids 77% and protein 8%

(8) Peanuts, dried: water 6%; lipids 47% and protein 25%

(9) Pistachio nuts, dried: water 5%; lipids 54% and protein 21%

(10) Pumpkin seeds, dried: water 5%; lipids 52% (comprising 52% of linoleic acid, 27% of oleic acid, 13% of palmitic acid and 5% of stearic acid); protein 27% and ash 4.7%

(11) Sesame seeds, dried: water 5%; lipids 50% (comprising from 40 to 45% of linoleic acid, from 37 to 42% of oleic acid, from 9 to 12% of palmitic acid and 5% of stearic acid) and protein 20%

(12) Watermelon seeds, dried: water 6%; lipids 46% (comprising 66% of linoleic acid, 14% of oleic acid, 9% of palmitic acid and 7% of stearic acid) and protein 30%

(13) Sunflower seeds, dried: water 4%; lipids 55% (comprising 62% of linoleic acid, 22% of oleic acid, 8% of palmitic acid and 5% of stearic acid) and protein 20%

Cyclodextrin is a cyclic oligosaccharide formed of several glucose units bonded together through $\alpha$-1,4-linkages. For example, cyclodextrins formed of 6, 7 and 8 glucose units are called α-, β- and γ-cyclodextrins, respectively. When the method of the present invention is practiced, the nuts or seeds may be admixed with a single kind or a combination of two kinds or more of these cyclodextrins or mixture with other substances such as a branched dextrin, etc. according to need.

The molecule of cyclodextrin exhibits oleophilicity inside the cyclic structure thereof while hydrophilicity is exhibited outside the cyclic molecular structure. By virtue of such a unique molecular structure, various kinds of oily materials are taken into the hollow space of the cyclic molecular structure and stabilized therein. In the course of pulverization or granulation of nuts or seeds with admixture of a certain amount of a cyclodextrin according to the method of the invention, namely, the oily material contained in the nuts or seeds is absorbed by the cyclodextrin under agitation to form a clathrate with stability so that a uniform and stable powdery or granular product of the nuts or seeds can be obtained.

The amount of the cyclodextrin to be added to nuts or seeds should be in the range from 0.1 to 300% by weight based on the nuts or seeds. When a powdery product is desired, in particular, the nuts or seeds are admixed with a cyclodextrin in an amount from 10 to 300% by weight or, preferably, from 50 to 150% by weight together with water in an amount from 200 to 1000% by weight or, preferably, fro 500 to 700% by weight and the mixture is subjected to comminution in a homogenizer or a grinding machine followed by spray drying of the thus obtained flowable mixture in a conventional manner to give a fine and uniform powdery product. It is optional in order to obtain more fully exhibited flavor inherent to the nuts or seeds that the above described pulverization procedure is preceded by roasting or frying of coarsely ground nuts or edible seeds.

When a granular product is desired, on the other hand, the powdery product obtained by the above described method may be granulated into grains of desired size, for example, in a fluidized-bed granulator. When a granular product of a larger granule size is desired, coarsely ground nuts or seeds are agitated in a mixer under a spray of an aqueous solution of a cyclodextrin followed by drying. In this case, the amount of the cyclodextrin should be in the range from 1 to 10% by weight or, preferably, from 4 to 6% by weight based on the nuts or seeds.

In the powdery or granular product of nuts or seeds prepared according to the method of the invention, the oily material therein is in a completely clathrate form in the molecules of the cyclodextrin so that the product is storable over a long period of time by virtue of the protection of the oily material against oxidation by atmospheric oxygen.

In the following, the method of the present invention is described in more detail by way of examples.

EXAMPLE 1

One part by weight of cashew nuts was coarsely ground in a crusher and then roasted at 170° C. for 15 minutes in a roaster. The thus roasted coarse grains of cashew nuts were admixed with 0.5 part by weight of cyclodextrin, which was a 50:50 mixture of a cyclodextrin and a branched dextrin, together with 8 parts by weight of water and homogenized for 5 minutes in a homogenizer.

The thus obtained flowable mixture was dried into powdery form by use of a disk-type spray drier under operating conditions with the disk rotating at 10,000 r.p.m. and the temperatures of the hot air of 190° C. and 120° C. at the inlet and outlet, respectively. The powdery product was completely dry and had excellent flowability.

EXAMPLE 2

Hamburger steaks for school lunch were prepared of a base admixed with 2% by weight of the powdered cashew nuts obtained in Example 1 and served for tasting by 20 boys and 22 girls of a first-year class of an elementary school. While the hamburger steaks prepared of the base without seasoning are not a favorite of the children and they usually eat the hamburger steaks with a large volume of Worcester sauce or ketchup put thereon, the children were asked to eat the hamburger steaks with a half volume of the ketchup thereon to make a comparison because the hamburger steaks served in this case were imparted with taste and flavor with the powdered cashew nuts blended therein in the amount of 2%.

As a result of this comparative test, the preference of the children was predominantly for the test preparation with admixture of the powdery cashew nuts rather than the hamburger steaks usually served in the school lunch as is shown in Table 1 below.

TABLE 1

|  | Boys | Girls | Total |
|---|---|---|---|
| Children who preferred hamburger steaks with powdery cashew nuts (a half volume of ketchup) | 17 | 20 | 37 |
| Children who preferred hamburger steaks without powdery cashew nuts (full volume of ketchup) | 3 | 2 | 5 |

EXAMPLE 3

Dried Brazil nuts were ground in a crusher into coarse grains, of which a portion was dried as such and reserved for storage test.

The remainder of the coarsely ground nuts was introduced into a ribbon mixer and agitated for 30 minutes under a spray of a 40% by weight aqueous solution of the same cyclodextrin as used in Example 1 in such a volume as to give 5% by weight of the cyclodextrin based on the nuts followed by drying for 1 hour at 60° C. in a hot-air drying oven to give a granulated product of Brazil nuts.

The thus prepared granulated product according to the invention and the coarsely ground product as such were subjected to a comparative storability test by visual inspection of the appearance and the determination of the peroxide value (POV) by the iron rhodanide method periodically undertaken during storage to give the results shown in Table 2.

TABLE 2

| Storage for | Item | As crushed | Sprayed with cyclodextrin solution |
|---|---|---|---|
| 10 days | POV | 0.12 | 0.01 |
|  | Appearance | Somewhat moist | Absolutely dry |
| 20 days | POV | 0.38 | 0.03 |
|  | Appearance | Somewhat moist | Absolutely dry |
| 30 days | POV | 0.65 | 0.06 |
|  | Appearance | Clammy | Absolutely dry |

TABLE 2-continued

| Storage for | Item | As crushed | Sprayed with cyclodextrin solution |
|---|---|---|---|
| 60 days | POV | 0.99 | 0.07 |
|  | Appearance | Clammy | Absolutely dry |
| 90 days | POV | — | 0.11 |
|  | Appearance | — | Almost unchanged but slightly moist |

As is clear from the results shown in Table 2, the product granulated with the spray of the cyclodextrin solution retains the initial condition almost unchanged even after 3 months of storage. On the contrary, the POV of the product as crushed exceeds 0.3 after 20 days of storage. This means that the crushed product of Brazil nuts as such is over the critical line already after 20 days of storage because any food having a POV larger than 0.3 is considered to have no value as a commercial product. Thus, the effectiveness of the inventive method using a cyclodextrin is very apparent from the results.

EXAMPLE 4

One part by weight of pumpkin seeds was roasted at 170° C. for 15 minutes in a roaster. A previously prepared 20% aqueous solution of one part by weight of the same cyclodextrin as used in Example 1, was circulated through a wet type grinding machine.

Then the roasted pumpkin seeds were introduced into a ground machine and grinded in the circulating cyclodextrin solution (at the same time, lipids of the pumpkin seeds were absorbed in the cyclodextrin to form a clathrate).

The thus obtained emulsion consisting of the pumpkin seeds and cyclodextrin was dried into powdery form by use of a nozzle-type spray drier under operating conditions in the the temperatures of the hot air of 180° C. and from 90° to 95° C. at the inlet and outlet, respectively and flow rate of 130 liters per hour. The thus obtained powdery product was completely dry and has excellent flowability and stability.

EXAMPLE 5

Sunflower seeds were roasted at 170° C. for 15 minutes in a gas-oven and then ground in a crusher into coarse grains, of which a portion was dried as such and reserved for storage test.

The remainder of the coarsely ground sunflower seeds was introduced into a fluidized-bed granulator, and hot air having a temperature of 60° C. was introduced into from the lower portion of the granulator to fluidize the sunflower seeds which was sprayed with a 40% aqueous solution of the same cyclodextrin as used in Example 1 in such a volume as to give 10% by weight of the cyclodextrin based on the seeds from the upper portion of the granulator to coat the surface of the seeds followed by drying to give a granulated product of the sunflower seeds.

The thus prepared granulated product according to the invention and the coarsely ground product as such were subjected to a comparative storability test by the determination of the POV. As a result, the POV value of the granulated product coated with cyclodextrin was from about 5 to 8 meq/kilogram. The granulated water product retained its initial condition almost unchanged even after 6 months of storage. On the other hand, the POV of the product as crushed exceeded 30 meq/kilogram already after 1 month of storage, and the said crushed product of the sunflower seeds is considered to have no value as a commercial product.

What is claimed is:

1. A dried nut or seed composition consisting essentially of an admixture of (i) pulverized or granulated nuts or seeds and (ii) a cyclodextrin, said cyclodextrin being in an amount of from 1 to 300% based on the amount of said nuts or seeds, said composition having been prepared by mechanically grinding said nuts or seeds in admixture with said cyclodextrin.

2. The composition of claim 1 wherein said composition is a powdery product containing at least 10% by weight of said nuts or seeds.

3. A composition of claim 2 containing from 50-150% by weight of said nuts or seeds.

4. The composition of claim 3 comprising an admixture of nuts which contain lipids in the range of from about 47-77%.

5. The composition of claim 4, wherein said nuts are selected from the group consisting of almond, cashew nuts, walnuts, Brazil nuts, pecans, hazelnuts, Macadania nuts, peanuts and pistachio nuts.

6. The composition of claim 3 comprising an admixture of seeds which contain lipids in the range of from about 30-55%.

7. The composition of claim 6, wherein said seeds are selected from the group consisting of pumpkin seeds, sesame seeds, watermelon seeds and sunflower seeds.

8. The composition of claim 1 which is a granular admixture of said nuts or seeds and from 1-10% by weight of said cyclodextrin based on the weight of the nuts or seeds.

9. The composition of claim 8 containing from 4-6% by weight of said cyclodextrin.

10. The composition of claim 8 comprising an admixture of nuts which contain lipids in the range of from about 47-77%.

11. The composition of claim 8 comprising an admixture of seeds which contain lipids in the range of from about 30-55%.

12. The composition of claim 9 comprising an admixture of cyclodextrin with nuts selected from the group consisting of almond, cashew nuts, walnuts, Brazil nuts, pecans, hazelnuts, Macadania nuts, peanuts and pistachio nuts.

13. The composition of claim 9 comprising an admixture of cyclodextrin with seeds selected from the group consisting of pumpkin seeds, sesame seeds, watermelon seeds and sunflower seeds.

14. A method for the preparation of pulverized or granulated nuts or seeds which consists essentially of admixing nuts or seeds with (i) a cyclodextrin in an amount from 1 to 300% by weight based on the weight of the nuts or seeds and (ii) water in an amount from 200 to 1000% by weight based on the weight of the nuts or seeds and mechanically grinding the resulting mixture to form a pulverized or granulated mixture and spray drying said pulverized or granulated mixture.

15. The method of claim 14, wherein said mechanical grinding is carried out in a homogenizer or a ribbon mixer or a wet type grinding machine.

16. The method of claim 14, wherein nuts which contain lipids in the range from about 47 to 77% are admixed with said cyclodextrin.

17. The method of claim 16, wherein the nuts are selected from the group consisting of almond, cashew nuts, walnuts, Brazil nuts, pecans, hazelnuts, Macadamia nuts, peanuts, pistachio nuts and mixture thereof.

18. The method of claim 14, wherein seeds which contain lipids in the range from about 30 to 55% are admixed with said cyclodextrin.

19. The method of claim 18, wherein the seeds are selected from the group consisting of pumpkin seeds, sesame seeds, watermelon seeds, sunflower seeds and mixture thereof.

20. The method of claim 18, wherein cyclodextrin is admixed in an amount of from 50 to 150% by weight and water is admixed in an amount of from 500 to 700% by weight.

21. The method of claim 16, wherein cyclodextrin is admixed in an amount of from 50 to 150% by weight and water is admixed in an amount of from 500 to 700% by weight.

22. The method of claim 14, wherein cyclodextrin is admixed in an amount of from 10 to 300% by weight.

* * * * *